(12) United States Patent
Kim et al.

(10) Patent No.: US 10,325,371 B1
(45) Date of Patent: Jun. 18, 2019

(54) METHOD AND DEVICE FOR SEGMENTING IMAGE TO BE USED FOR SURVEILLANCE USING WEIGHTED CONVOLUTION FILTERS FOR RESPECTIVE GRID CELLS BY CONVERTING MODES ACCORDING TO CLASSES OF AREAS TO SATISFY LEVEL 4 OF AUTONOMOUS VEHICLE, AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/254,448

(22) Filed: Jan. 22, 2019

(51) Int. Cl.
*G06K 9/46* (2006.01)
*G06K 9/62* (2006.01)
(Continued)

(52) U.S. Cl.
CPC .............. *G06T 7/10* (2017.01); *G06K 9/4642* (2013.01); *G06K 9/6257* (2013.01);
(Continued)

(58) Field of Classification Search
CPC .. G06K 9/6257; G06K 9/4642; G06K 9/6262; G06N 3/04; G06N 7/005
See application file for complete search history.

(56) References Cited

U.S. PATENT DOCUMENTS 10,157,441 B2 * 12/2018 Chang .................... G06K 9/628
2012/0134579 A1 * 5/2012 Kameyama ........... G06T 3/4053
382/159

(Continued)

OTHER PUBLICATIONS

V. Badrinarayanan, A. Kendall and R. Cipolla, "SegNet: A Deep Convolutional Encoder-Decoder Architecture for Image Segmentation," in IEEE Transactions on Pattern Analysis and Machine Intelligence, vol. 39, No. 12, pp. 2481-2495, Dec. 1, 2017. (Year: 2017).*

*Primary Examiner* — Utpal D Shah
(74) *Attorney, Agent, or Firm* — XSENSUS LLP

(57) ABSTRACT

A method for segmenting an image by using each of a plurality of weighted convolution filters for each of grid cells to be used for converting modes according to classes of areas is provided to satisfy level 4 of an autonomous vehicle. The method includes steps of: a learning device (a) instructing (i) an encoding layer to generate an encoded feature map and (ii) a decoding layer to generate a decoded feature map; (b) if a specific decoded feature map is divided into the grid cells, instructing a weight convolution layer to set weighted convolution filters therein to correspond to the grid cells, and to apply a weight convolution operation to the specific decoded feature map; and (c) backpropagating a loss. The method is applicable to CCTV for surveillance as the neural network may have respective optimum parameters to be applied to respective regions with respective distances.

16 Claims, 6 Drawing Sheets

(51) Int. Cl.
  *G06N 3/04* (2006.01)
  *G06T 7/10* (2017.01)
  *G06N 7/00* (2006.01)

(52) U.S. Cl.
  CPC ............ *G06K 9/6262* (2013.01); *G06N 3/04* (2013.01); *G06N 7/005* (2013.01); *G06T 2207/20081* (2013.01); *G06T 2207/20084* (2013.01); *G06T 2207/30256* (2013.01)

(56) References Cited

U.S. PATENT DOCUMENTS

| | | | |
|---|---|---|---|
| 2017/0206434 A1* | 7/2017 | Nariyambut Murali | ..................... G06K 9/628 |
| 2018/0108137 A1* | 4/2018 | Price | .......................... G06T 7/11 |
| 2018/0122114 A1* | 5/2018 | Luan | ........................ G06T 7/194 |
| 2018/0211620 A1* | 7/2018 | Kurokawa | ........... G09G 3/3688 |
| 2018/0300564 A1* | 10/2018 | Kwant | ............... G06K 9/00818 |
| 2018/0307980 A1* | 10/2018 | Barik | ........................ G06N 3/08 |
| 2019/0035101 A1* | 1/2019 | Kwant | ........................ G06T 7/60 |
| 2019/0049540 A1* | 2/2019 | Odry | ................... G01R 33/5608 |
| 2019/0050981 A1* | 2/2019 | Song | ..................... G06T 7/0012 |
| 2019/0079999 A1* | 3/2019 | Min | ...................... G06F 16/335 |
| 2019/0080456 A1* | 3/2019 | Song | ........................ G06T 7/143 |

\* cited by examiner

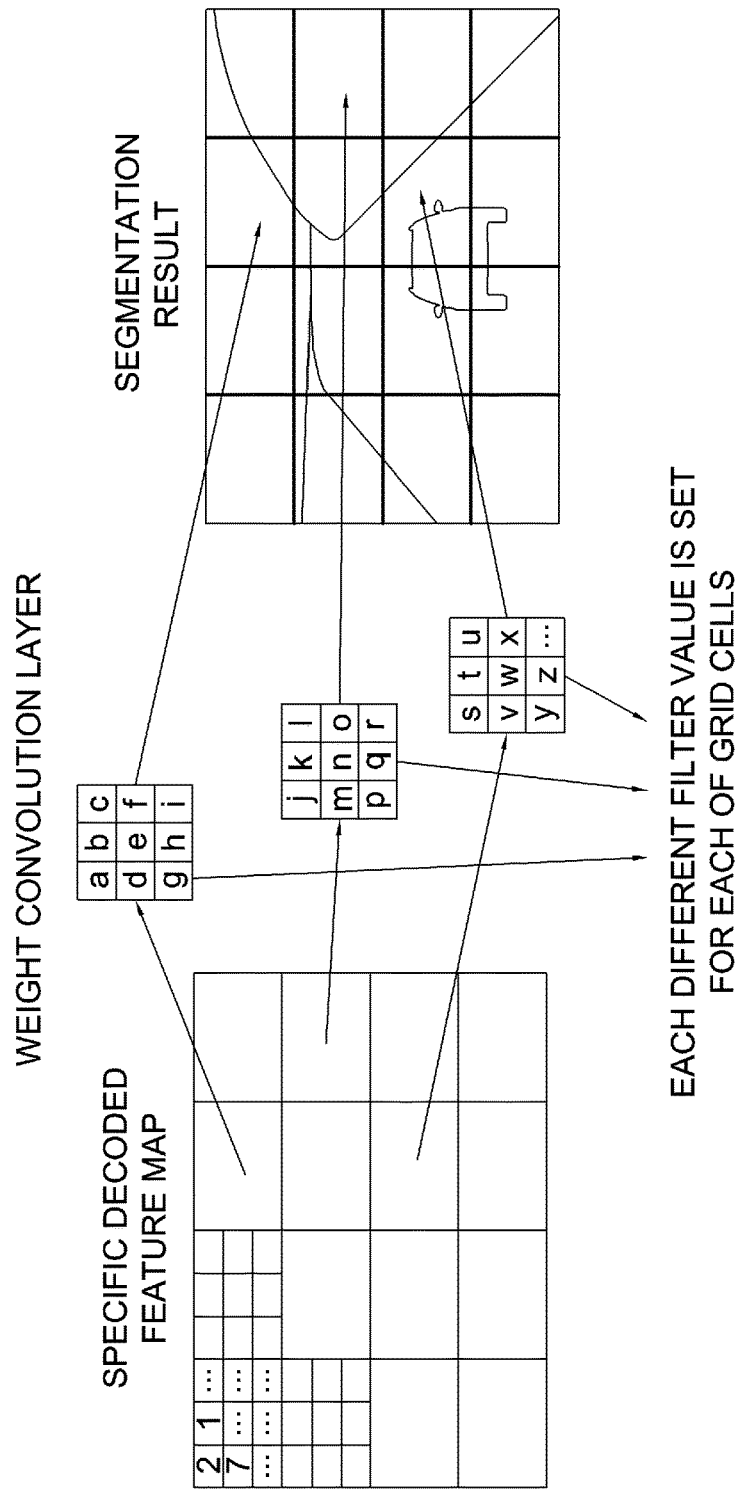

REFERENCE AREA

METHOD AND DEVICE FOR SEGMENTING IMAGE TO BE USED FOR SURVEILLANCE USING WEIGHTED CONVOLUTION FILTERS FOR RESPECTIVE GRID CELLS BY CONVERTING MODES ACCORDING TO CLASSES OF AREAS TO SATISFY LEVEL 4 OF AUTONOMOUS VEHICLE, AND TESTING METHOD AND TESTING DEVICE USING THE SAME

FIELD OF THE DISCLOSURE

The present disclosure relates to a method for segmenting at least one image by using each of a plurality of weighted convolution filters for each of grid cells to be used for converting modes according to classes of areas to satisfy level 4 of an autonomous vehicle; and more particularly, to the method for segmenting the image by using each of the weighted convolution filters for each of the grid cells, including steps of: (a) if at least one input image is obtained, instructing (i) an encoding layer of a convolutional neural network (CNN) module to apply at least one convolution operation to the input image, to thereby generate at least one encoded feature map and (ii) a decoding layer of the CNN module to apply at least one deconvolution operation to a specific encoded feature map outputted from the encoding layer, to thereby generate at least one decoded feature map; (b) if a specific decoded feature map outputted from the decoding layer is divided into a plurality of the grid cells according to one or more predetermined criteria, instructing a weight convolution layer of the CNN module to set each of the weighted convolution filters therein to be corresponding to each of the grid cells, and to apply at least one weight convolution operation to the specific decoded feature map, to thereby output a segmentation result; and (c) performing backpropagation by using a segmentation loss obtained by referring to the segmentation result and its corresponding ground truth (GT), to thereby learn each of the weighted convolution filters for each of the grid cells, and a learning device, a testing method, and a testing device using the same.

BACKGROUND OF THE DISCLOSURE

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network has become a very useful tool in the field of the machine learning.

Image segmentation is a method of generating a label image by using an image, e.g., a training image or a test image. As the deep learning technology has become popular, the image segmentation is also performed by using the deep learning technology.

The image segmentation based on the deep learning technology may be acquired by feeding an input image into an encoder-decoder network and then by applying a convolution operation to a final result outputted from the decoder. Herein, when the convolution operation is applied to the final result outputted from the decoder, a convolution filter with a same weight is generally applied to all areas of the final result.

Assuming that the image segmentation is performed under a situation that a camera is fixed and arrangements of objects and roads included in a plurality of input images are similar with each other (e.g., the arrangements in which each of the roads is located at each of centers of the images, each of sidewalks is located at each of right and left sides of the images, and each of buildings and each of the skies are arranged at each of upper sides of the images) like a free space detection (FSD) used for an advanced driver assistance system (ADAS), if the convolution filter with the same weight is applied to the whole area in one of the images, a unnecessarily large amount of operations may be performed without utilizing the characteristics that the arrangements are similar with each other, and thus output results acquired by performing processes of the image segmentation by using the input images may not be good enough.

SUMMARY OF THE DISCLOSURE

It is an object of the present disclosure to solve all the aforementioned problems.

It is another object of the present disclosure to perform an image segmentation by using each of a plurality of weighted convolution filters for each of grid cells set in a decoded feature map corresponding to an input image.

It is still another object of the present disclosure to linearly transform a reference filter value by using a specific convolution filter, as a reference filter, corresponding to a specific grid cell occupying a large portion in the decoded feature map, to thereby allow filter values of the rest of the grid cells to be calculated.

In accordance with one aspect of the present disclosure, there is provided a method for segmenting an image by using each of a plurality of weighted convolution filters for each of grid cells, including steps of: (a) a learning device, if at least one input image is obtained, instructing (i) an encoding layer of a convolutional neural network (CNN) module to apply at least one convolution operation to the input image, to thereby generate at least one encoded feature map and (ii) a decoding layer of the CNN module to apply at least one deconvolution operation to a specific encoded feature map outputted from the encoding layer, to thereby generate at least one decoded feature map; (b) the learning device, if a specific decoded feature map outputted from the decoding layer is divided into a plurality of the grid cells according to one or more predetermined criteria, instructing a weight convolution layer of the CNN module to set each of the weighted convolution filters therein to be corresponding to each of the grid cells, and to apply at least one weight convolution operation to the specific decoded feature map, to thereby output a segmentation result; and (c) the learning device performing backpropagation by using a segmentation loss obtained by referring to the segmentation result and its corresponding ground truth (GT), to thereby learn each of the weighted convolution filters for each of the grid cells.

As one example, the step of (b) includes a step of: the learning device setting a largest area among one or more areas, which are respectively grouped according to at least one specific criteria by referring to at least one feature value on the specific decoded feature map, as a reference area, wherein each of the weighted convolution filters for each of the grid cells is expressed as a following equation: $W\_C\_Filter_i = \alpha_i * B + \beta_i$, wherein $W\_C\_Filter_i$ denotes each value of each of the weighted convolution filters for each of the grid cells, B denotes a reference filter value corresponding to the reference area, and each of $\alpha_i$ and $\beta_i$ denotes each of linear transformation parameters corresponding to each of the weighted convolution filters for each of the grid cells, and wherein, at the step of (c), the learning device learns each of the weighted convolution filters for each of the grid cells by learning the $\alpha_i$, $\beta_i$, and B.

As one example, at the step of (b), the learning device sets the largest area among one or more areas, which are respectively grouped according to a range of the feature value by referring to the feature value on the specific decoded feature map, as the reference area.

As one example, the input image includes a plurality of training images, wherein, on condition that there are first location information to k-th location information corresponding to a first partial area to a k-th partial area in each of the plurality of the training images, the input image is selected to include specific training images in which respective relative variations of at least part of the first location information to the k-th location information are equal to or less than one or more predetermined thresholds.

As one example, at the step of (b), each of the grid cells has a same size and a same shape.

As one example, the input image is an image representing a road-driving situation, and the learning device is used for free space detection while a vehicle is driving on a road.

In accordance with another aspect of the present disclosure, there is provided a testing method for segmenting an image by using each of a plurality of weighted convolution filters for each of grid cells, including steps of: (a) on condition that (1) a learning device has instructed an encoding layer of a convolutional neural network (CNN) module (i) to apply at least one convolution operation to at least one training image, to thereby generate at least one encoded feature map for training and (ii) the learning device has instructed a decoding layer of the CNN module to apply at least one deconvolution operation to a specific encoded feature map for training outputted from the encoding layer, to thereby generate at least one decoded feature map for training; (2) the learning device, if a specific decoded feature map for training outputted from the decoding layer is divided into a plurality of the grid cells according to one or more predetermined criteria, has instructed a weight convolution layer of the CNN module to set each of the weighted convolution filters therein to be corresponding to each of the grid cells, and to apply at least one weight convolution operation to the weight convolution layer to the specific decoded feature map for training outputted from the decoding layer, to thereby output a segmentation result for training; and (3) the learning device has performed backpropagation by using a segmentation loss obtained by referring to the segmentation result and its corresponding ground truth (GT), to thereby learn each of the weighted convolution filters for each of the grid cells, a testing device, if at least one test image is obtained, instructing (i) the encoding layer of the CNN module to apply the at least one convolution operation to the test image, to thereby generate at least one encoded feature map for testing and (ii) the decoding layer of the CNN module to apply the at least one deconvolution operation to a specific encoded feature map for testing outputted from the encoding layer, to thereby generate at least one decoded feature map for testing; and (b) the testing device, if a specific decoded feature map for testing outputted from the decoding layer is divided into a plurality of the grid cells according to one or more predetermined criteria, instructing the weight convolution layer of the CNN module to set each of the weighted convolution filters therein to be corresponding to each of the grid cells, and to apply the at least one weight convolution operation to the specific decoded feature map for testing outputted from the decoding layer, to thereby output a segmentation result for testing.

As one example, the test image is an image representing a road-driving situation, and the testing device is used for free space detection while a vehicle is driving on a road.

In accordance with still another aspect of the present disclosure, there is provided a learning device for segmenting an image by using each of a plurality of weighted convolution filters for each of grid cells, including: at least one memory that stores instructions; and at least one processor configured to execute the instructions to: perform processes of (I) instructing (i) an encoding layer of a convolutional neural network (CNN) module to apply at least one convolution operation to at least one input image, to thereby generate at least one encoded feature map and (ii) a decoding layer of the CNN module to apply at least one deconvolution operation to a specific encoded feature map outputted from the encoding layer, to thereby generate at least one decoded feature map, (II) if a specific decoded feature map outputted from the decoding layer is divided into a plurality of the grid cells according to one or more predetermined criteria, instructing a weight convolution layer of the CNN module to set each of the weighted convolution filters therein to be corresponding to each of the grid cells, and to apply at least one weight convolution operation to the specific decoded feature map, to thereby output a segmentation result, and (III) performing backpropagation by using a segmentation loss obtained by referring to the segmentation result and its corresponding ground truth (GT), to thereby learn each of the weighted convolution filters for each of the grid cells.

As one example, the process of (II) includes a process of: setting a largest area among one or more areas, which are respectively grouped according to at least one specific criteria by referring to at least one feature value on the specific decoded feature map, as a reference area, wherein each of the weighted convolution filters for each of the grid cells is expressed as a following equation: $W\_C\_Filter_i = \alpha_i * B + \beta_i$, wherein $W\_C\_Filter_i$ denotes each value of each of the weighted convolution filters for each of the grid cells, B denotes a reference filter value corresponding to the reference area, and each of $\alpha_i$ and $\beta_i$ denotes each of linear transformation parameters corresponding to each of the weighted convolution filters for each of the grid cells, and wherein, at the process of (III), the processor learns each of the weighted convolution filters for each of the grid cells by learning the $\alpha_i$, $\beta_i$, and B.

As one example, at the process of (II), the processor sets the largest area among one or more areas, which are respectively grouped according to a range of the feature value by referring to the feature value on the specific decoded feature map, as the reference area.

As one example, the input image includes a plurality of training images, wherein, on condition that there are first location information to k-th location information corresponding to a first partial area to a k-th partial area in each of the plurality of the training images, the input image is selected to include specific training images in which respective relative variations of at least part of the first location information to the k-th location information are equal to or less than one or more predetermined thresholds.

As one example, at the process of (II), each of the grid cells has a same size and a same shape.

As one example, the input image is an image representing a road-driving situation, and the learning device is used for free space detection while a vehicle is driving on a road.

In accordance with still yet another aspect of the present disclosure, there is provided a testing device for segmenting an image by using each of a plurality of weighted convolution filters for each of grid cells, including: at least one memory that stores instructions; and at least one processor, on condition that (1) a learning device has instructed an encoding layer of a convolutional neural network (CNN) module (i) to apply at least one convolution operation to at least one training image, to thereby generate at least one encoded feature map for training and (ii) the learning device has instructed a decoding layer of the CNN module to apply at least one deconvolution operation to a specific encoded feature map for training outputted from the encoding layer, to thereby generate at least one decoded feature map for training; (2) the learning device, if a specific decoded feature map for training outputted from the decoding layer is divided into a plurality of the grid cells according to one or more predetermined criteria, has instructed a weight convolution layer of the CNN module to set each of the weighted convolution filters therein to be corresponding to each of the grid cells, and to apply at least one weight convolution operation to the weight convolution layer to the specific decoded feature map for training outputted from the decoding layer, to thereby output a segmentation result for training; and (3) the learning device has performed backpropagation by using a segmentation loss obtained by referring to the segmentation result and its corresponding ground truth (GT), to thereby learn each of the weighted convolution filters for each of the grid cells; configured to execute the instructions to: perform processes of (I) instructing (i) the encoding layer of the CNN module to apply the at least one convolution operation to at least one test image, to thereby generate at least one encoded feature map for testing and (ii) the decoding layer of the CNN module to apply the at least one deconvolution operation to a specific encoded feature map for testing outputted from the encoding layer, to thereby generate at least one decoded feature map for testing, and (II) if a specific decoded feature map for testing outputted from the decoding layer is divided into a plurality of the grid cells according to one or more predetermined criteria, instructing the weight convolution layer of the CNN module to set each of the weighted convolution filters therein to be corresponding to each of the grid cells, and to apply the at least one weight convolution operation to the specific decoded feature map for testing outputted from the decoding layer, to thereby output a segmentation result for testing.

As one example, the test image is an image representing a road-driving situation, and the testing device is used for free space detection while a vehicle is driving on a road.

BRIEF DESCRIPTION OF THE DRAWINGS

The above and other objects and features of the present disclosure will become apparent from the following description of preferred embodiments given in conjunction with the accompanying drawings, in which:

FIG. 4 is a drawing illustrating a process of a weight convolution layer in the CNN module in accordance with the present disclosure.

DETAILED DESCRIPTION OF THE PREFERRED EMBODIMENTS

Figure 1:
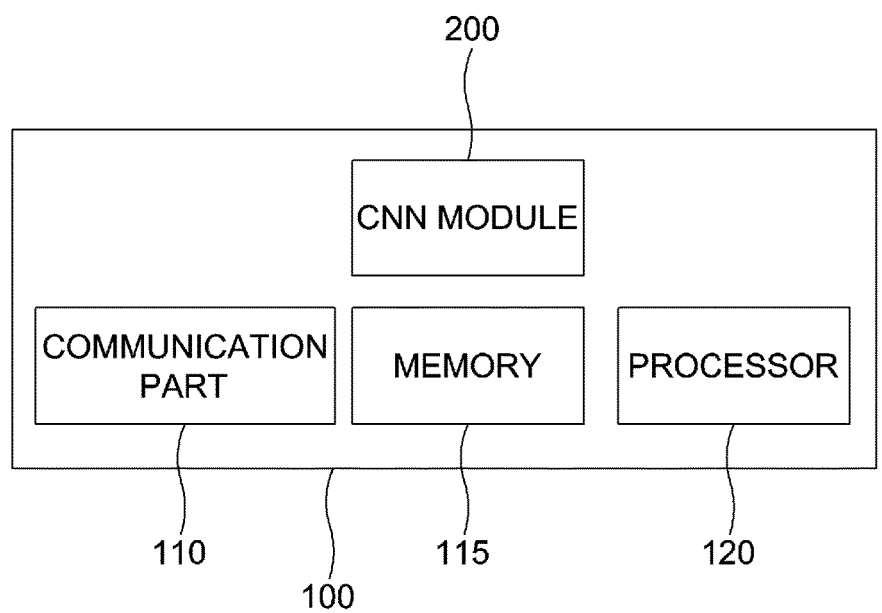
FIG. 1 is a drawing illustrating a configuration of a learning device.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing illustrating a configuration of a learning device.

Referring to FIG. 1, a learning device 100 may include a processor 110 and a communication part 120. Further, the learning device may include a convolutional neural network (CNN) module 200 or may interact with the CNN module 200 without including the CNN module therein as the case may be. One or more processes of learning one or more parameters of the CNN module 200 may be performed by the processor 110. In addition, the learning device may further include a memory 115 capable of storing computer readable instructions for performing following processes. As one example, the processor, the memory, a medium, etc. may be integrated with an integrated processor.

Figure 2:
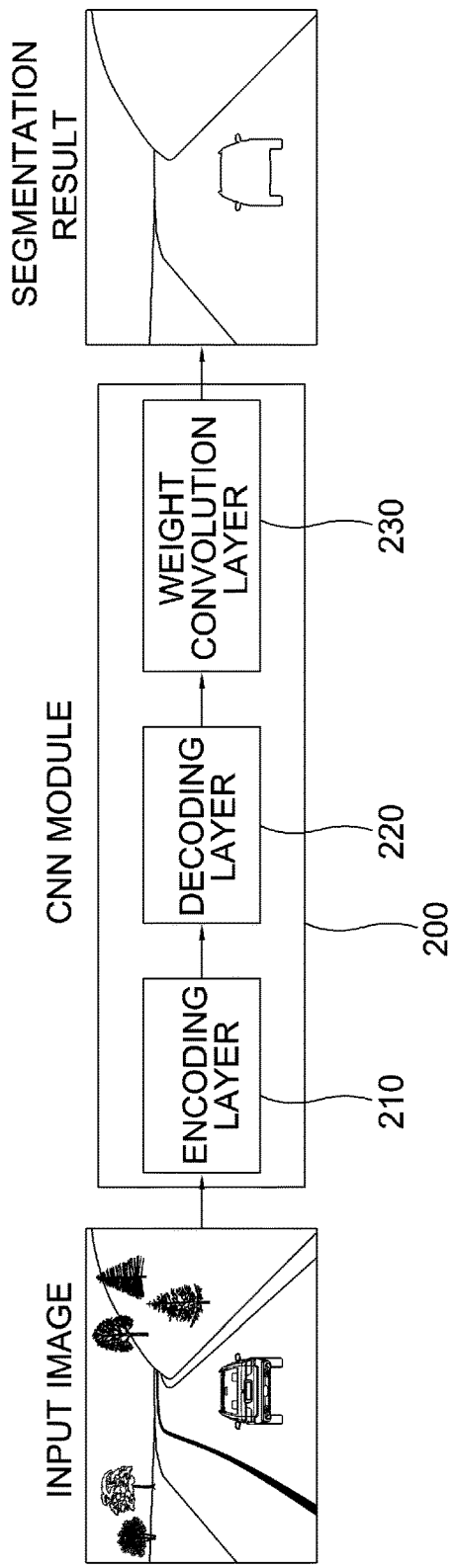
FIG. 2 is a drawing illustrating a process of performing an image segmentation by using each of a plurality of weighted convolution filters for each of grid cells.

FIG. 2 is a drawing illustrating a process of operating, by the CNN module, an input image in accordance with the present disclosure.

Referring to FIG. 2, the CNN module 200 may include an encoding layer 210, a decoding layer 220 and a weight convolution layer 230.

Specifically, the encoding layer 210 may perform a process of applying at least one convolution operation to the input image, to thereby generate at least one encoded feature map, and the decoding layer 220 may perform a process of applying at least one deconvolution operation to a specific encoded feature map outputted from the encoding layer 210, to thereby generate at least one decoded feature map. Herein, the specific encoded feature map outputted from the encoding layer 210 may be a feature map finally outputted from the encoding layer, but the present disclosure is limited to this example.

Thereafter, the weight convolution layer 230 may perform a process of applying at least one weight convolution operation to a specific decoded feature map outputted from the decoding layer, to thereby output a segmentation result, which will be described in detail later by referring to FIG. 4. Herein, the specific decoded feature map may be a feature map finally outputted from the decoding layer, but the present disclosure is not limited to this example.

Figure 3:
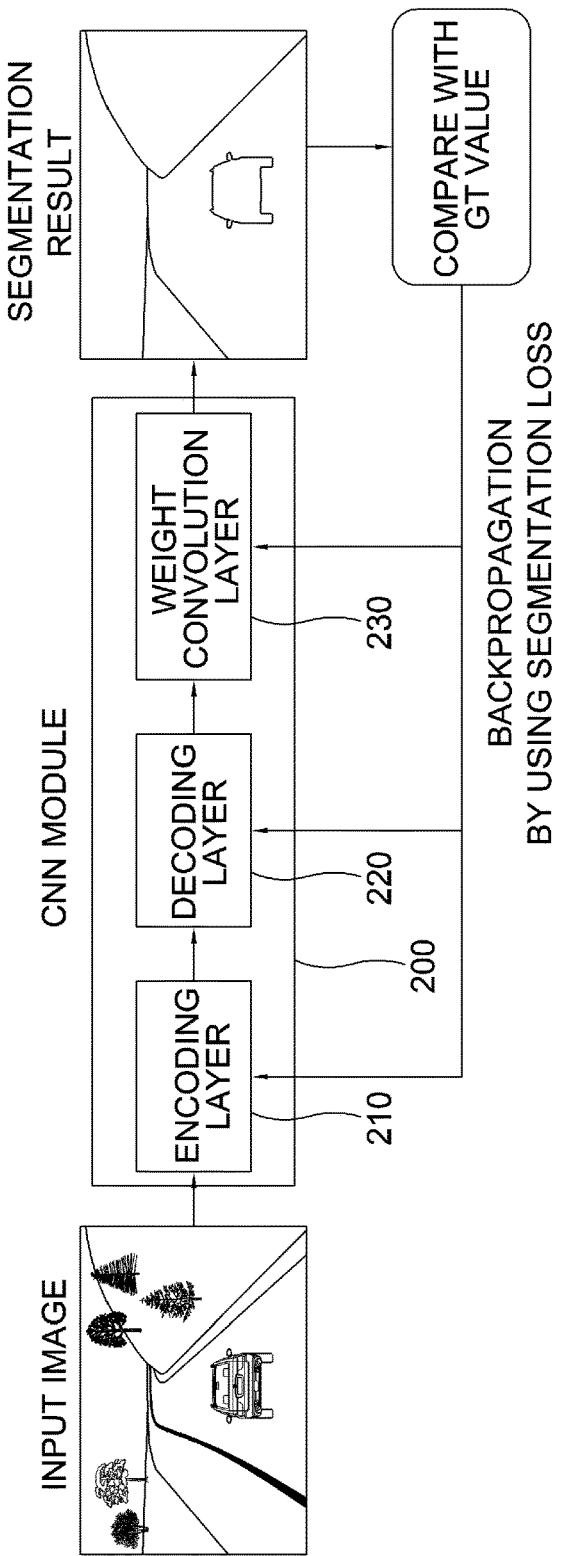
FIG. 3 is a drawing illustrating a process of learning one or more parameters of a convolutional neural network (CNN) module capable of performing the image segmentation in accordance with the present disclosure.

FIG. 3 is a drawing representing a process of learning, by the CNN module 200, one or more parameters of the encoding layer 210, the decoding layer 220 and the weight convolution layer 230.

In the description of FIG. 3, the configuration already described by referring to FIG. 2 will be omitted.

Referring to FIG. 3, the weight convolution layer 230 outputs the segmentation result. Herein, the segmentation result may be a prediction result of segmenation, and the learning device performs backpropagation by using a segmentation loss obtained by referring to the segmentation result and its corresponding ground truth (GT), to thereby learn one or more parameters of the CNN module.

Specifically, the learning device 100 performs the backpropagation in the order of the weight convolution layer 230, the decoding layer 220, and the encoding layer 210, to thereby learn the parameters. Such a learning process may be completed if the loss becomes smaller than a specific threshold, but the present disclosure is not limited to this example.

FIG. 4 is a drawing specifically illustrating an operation of the weight convolution layer 230 in accordance with the present disclosure.

If the specific decoded feature map outputted from the decoding layer 220 is divided into a plurality of the grid cells according to one or more predetermined criteria, the learning device 100 instructs the weight convolution layer 230 of the CNN module 200 to set each of the weighted convolution filters therein to be corresponding to each of the grid cells, and to apply at least one weight convolution operation to the specific decoded feature map, to thereby output the segmentation result. Herein, shapes and sizes of all grid cells may be set to be same, e.g., same squares, but the present disclosure is not limited to this example.

Referring to convolution filter values of FIG. 4, i.e., {a, b, c, d, e, f, g, h, i}, {j, k, l, m, n, 0, p, q, r}, etc., it is understood that each different filter value is set for each of the grid cells. As such, the image segmentation may be performed by applying different weights to specific portions which need to be expressed in detail and other portions which do not need to be expressed in detail.

For example, if the learning device 100 in an advanced driving assistance system (ADAS) of a vehicle is used for a free space detection, in the segmentation result, one or more roads or one or more objects, e.g., obstacles such as vehicles, on the roads should be expressed in detail, but backgrounds such as the sky do not need to expressed in detail, and thus in its corresponding ground truth (GT), the road portions will be expressed in detail and other portions will not be expressed in detail. In such a case, each value of each of the weighted convolution filters for each of the grid cells corresponding to the roads will become large, and each value of each of the weighted convolution filters for each of the grid cells corresponding to the backgrounds will become small. Through such a process, the objects on the roads will be more accurately segmented.

Likewise, since each of the weighted convolution filters is set differently for each of the grid cells, the image segmentation is more efficiently performed on condition that arrangements of the objects and the roads included in a plurality of input images are similar with each other (e.g., the arrangements in which each of the roads is located at each of centers of the images, each of sidewalks is located at each of right and left sides of the images, and each of buildings and each of the skies are arranged at each of upper sides of the images) like the free space detection (FSD) used for the advanced driver assistance system (ADAS).

Specifically, assuming that there are first location information to k-th location information corresponding to a first partial area to a k-th partial area in each of the plurality of the training images, the input image is selected to include specific training images in which respective relative variations of at least part of the first location information to the k-th location information are equal to or less than one or more predetermined thresholds.

For example, assuming that the sky, the roads and the sidewalks correspond to the first partial area, the second partial area and the third partial area, the first location information, the second location information and the third location information can be determined based on the fact that the sky is located at the upper portion of the image, the roads are located at the center portion of the image, and the sidewalks are located at the right and the left portions of the image. Herein, the first, the second and the third location information can be acquired by referring to each of center coordinates of the first, the second and the third partial areas of each input image.

There may be various schemes of determining each value of each of the weighted convolution filters for each of grid cells other than a scheme of directly determining said each value through the learning process. For example, a scheme of obtaining a value of a specific convolution filter corresponding to a specific grid cell corresponding to a reference area, i.e., a so-called reference filter value, and then linearly transforming the reference filter value, to thereby obtaining filter values at surrounding portions, may be used.

Herein, the reference area represents a largest area among one or more areas, which are respectively grouped according to at least one specific criteria by referring to at least one feature value on the specific decoded feature map. In other words, on condition that the input image is divided into a plurality of areas according to the characteristics of each area, a representative area among all the areas is determined as the reference area.

Figure 5A:
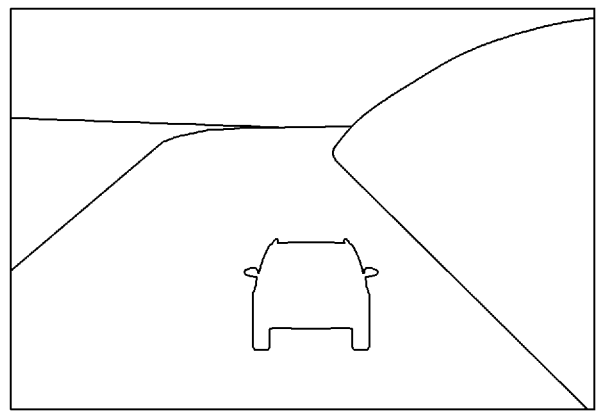
FIGS. 5A and 5B are drawings illustrating an example of setting a reference area in accordance with the present disclosure.
Figure 5B:
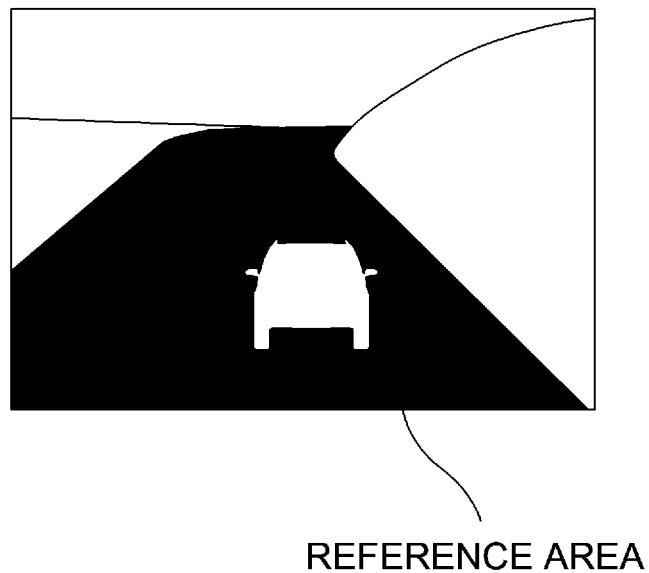

FIGS. 5A and 5B are drawings illustrating an example of setting the reference area in accordance with the present disclosure.

The reference area is shown as a black portion in FIG. 5B. Herein, the reference area is an area corresponding to a road occupying the largest area in the image. However, the reference area may not be actually set on the image, but the reference area may be actually determined on the specific decoded feature map by referring to the feature values on the specific decoded feature map. In FIGS. 5A and 5B, the images are shown instead of the decoded feature map for the convenience of description.

The reference area will be set as described above, and hereinafter, it will be described (i) how the reference filter is determined, (ii) through which linear transformation the convolution filter values for some grids corresponding to surrounding area near the reference area are operated, (iii) how the equation of the linear transformation and the parameters of the linear transformation are determined, etc.

Each of the weighted convolution filters for each of the grid cells is expressed as a following equation:

$$W\_C\_Filter_i = \alpha_i * B + \beta_i.$$

Herein, $W\_C\_Filter_i$ denotes each value of each of the weighted convolution filters for each of the grid cells, B denotes the reference filter value corresponding to the reference area, and each of $\alpha_i$ and $\beta_i$ denotes each of the linear transformation parameters corresponding to each of the weighted convolution filters for each of the grid cells.

Herein, $\alpha_i$, $\beta_i$, and B may be learned by backpropagation as shown in FIG. 3.

Hereinafter, a scheme in which the CNN module functions as a testing device when the learning of the CNN module 200 has been completed will be described by referring to FIG. 2.

Referring to FIG. 2, when the CNN module receives an input image, the operations of the encoding layer 210, the decoding layer 220, and the weight convolution layer 230 are sequentially applied to the input image, to thereby output a segmentation result. Since the parameters of the respective layers have already been learned before the testing process, the process of calculating a loss by using GT is exempted. Namely, the configuration of the testing device is different from that of the learning device in that the configuration of the testing device does not include a process of backpropagating the loss.

If the result of the image segmentation with respect to the road-driving image is generated through the above-described method, the result of the image segmentation can be used for the free space detection.

The present disclosure has an effect of obtaining an optimized image segmentation result by using each of the plurality of weighted convolution filters for each of the grid cells when the arrangements of the objects and the roads included in the input images are similar with each other.

The above-described method can be used for converting modes according to classes of areas is provided to satisfy level 4 of an autonomous vehicle and may be applicable to CCTV for surveillance as the neural network may have respective optimum parameters to be applied to respective regions with respective distances.

It would be understood by one of ordinary skill in the art that a transmission and/or a reception of the above-described images such as the training image and the test image can be performed by communication parts of the learning device and the testing device, and processes of the convolution operation, the deconvolution operation and the loss value operation can be mainly performed by processors of the learning device and the testing device, but the present disclosure is not limited to these examples. In addition, memories capable of storing computer readable instructions for performing the above-described processes may be included in the learning device and/or the testing device. As one example, the processor, the memory, a medium, etc. may be integrated with an integrated processor.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for segmenting an image by using each of a plurality of weighted convolution filters for each of grid cells, comprising steps of:
   (a) a learning device, if at least one input image is obtained, instructing (i) an encoding layer of a convolutional neural network (CNN) module to apply at least one convolution operation to the input image, to thereby generate at least one encoded feature map and (ii) a decoding layer of the CNN module to apply at least one deconvolution operation to a specific encoded feature map outputted from the encoding layer, to thereby generate at least one decoded feature map;
   (b) the learning device, if a specific decoded feature map outputted from the decoding layer is divided into a plurality of the grid cells according to one or more predetermined criteria, instructing a weight convolution layer of the CNN module to set each of the weighted convolution filters therein to be corresponding to each of the grid cells, and to apply at least one weight convolution operation to the specific decoded feature map, to thereby output a segmentation result; and (c) the learning device performing backpropagation by using a segmentation loss obtained by referring to the segmentation result and its corresponding ground truth (GT), to thereby learn each of the weighted convolution filters for each of the grid cells.

2. The method of claim 1, wherein the step of (b) includes a step of: the learning device setting a largest area among one or more areas, which are respectively grouped according to at least one specific criteria by referring to at least one feature value on the specific decoded feature map, as a reference area, wherein each of the weighted convolution filters for each of the grid cells is expressed as a following equation:

$$W\_C\_Filter_i = \alpha_i * B + \beta_i,$$

wherein $W\_C\_Filter_i$ denotes each value of each of the weighted convolution filters for each of the grid cells, B denotes a reference filter value corresponding to the reference area, and each of $\alpha_i$ and $\beta_i$ denotes each of linear transformation parameters corresponding to each of the weighted convolution filters for each of the grid cells, and wherein, at the step of (c), the learning device learns each of the weighted convolution filters for each of the grid cells by learning the $\alpha_i$, $\beta_i$, and B.

3. The method of claim 2, wherein, at the step of (b), the learning device sets the largest area among one or more areas, which are respectively grouped according to a range of the feature value by referring to the feature value on the specific decoded feature map, as the reference area.

4. The method of claim 1, wherein the input image includes a plurality of training images, and wherein, on condition that there are first location information to k-th location information corresponding to a first partial area to a k-th partial area in each of the plurality of the training images, the input image is selected to include specific training images in which respective relative variations of at least part of the first location information to the k-th location information are equal to or less than one or more predetermined thresholds.

5. The method of claim 1, wherein, at the step of (b), each of the grid cells has a same size and a same shape.

6. The method of claim 1, wherein the input image is an image representing a road-driving situation, and the learning device is used for free space detection while a vehicle is driving on a road.

7. A testing method for segmenting an image by using each of a plurality of weighted convolution filters for each of grid cells, comprising steps of:

(a) on condition that (1) a learning device has instructed an encoding layer of a convolutional neural network (CNN) module (i) to apply at least one convolution operation to at least one training image, to thereby generate at least one encoded feature map for training and (ii) the learning device has instructed a decoding layer of the CNN module to apply at least one deconvolution operation to a specific encoded feature map for training outputted from the encoding layer, to thereby generate at least one decoded feature map for training;

(2) the learning device, if a specific decoded feature map for training outputted from the decoding layer is divided into a plurality of the grid cells according to one or more predetermined criteria, has instructed a weight convolution layer of the CNN module to set each of the weighted convolution filters therein to be corresponding to each of the grid cells, and to apply at least one weight convolution operation to the weight convolution layer to the specific decoded feature map for training outputted from the decoding layer, to thereby output a segmentation result for training; and (3) the learning device has performed backpropagation by using a segmentation loss obtained by referring to the segmentation result and its corresponding ground truth (GT), to thereby learn each of the weighted convolution filters for each of the grid cells, a testing device, if at least one test image is obtained, instructing (i) the encoding layer of the CNN module to apply the at least one convolution operation to the test image, to thereby generate at least one encoded feature map for testing and (ii) the decoding layer of the CNN module to apply the at least one deconvolution operation to a specific encoded feature map for testing outputted from the encoding layer, to thereby generate at least one decoded feature map for testing; and (b) the testing device, if a specific decoded feature map for testing outputted from the decoding layer is divided into a plurality of the grid cells according to one or more predetermined criteria, instructing the weight convolution layer of the CNN module to set each of the weighted convolution filters therein to be corresponding to each of the grid cells, and to apply the at least one weight convolution operation to the specific decoded feature map for testing outputted from the decoding layer, to thereby output a segmentation result for testing.

8. The testing method of claim 7, wherein the test image is an image representing a road-driving situation, and the testing device is used for free space detection while a vehicle is driving on a road.

9. A learning device for segmenting an image by using each of a plurality of weighted convolution filters for each of grid cells, comprising:

at least one memory that stores instructions; and at least one processor configured to execute the instructions to: perform processes of (I) instructing (i) an encoding layer of a convolutional neural network (CNN) module to apply at least one convolution operation to at least one input image, to thereby generate at least one encoded feature map and (ii) a decoding layer of the CNN module to apply at least one deconvolution operation to a specific encoded feature map outputted from the encoding layer, to thereby generate at least one decoded feature map, (II) if a specific decoded feature map outputted from the decoding layer is divided into a plurality of the grid cells according to one or more predetermined criteria, instructing a weight convolution layer of the CNN module to set each of the weighted convolution filters therein to be corresponding to each of the grid cells, and to apply at least one weight convolution operation to the specific decoded feature map, to thereby output a segmentation result, and (III) performing backpropagation by using a segmentation loss obtained by referring to the segmentation result and its corresponding ground truth (GT), to thereby learn each of the weighted convolution filters for each of the grid cells.

10. The learning device of claim 9, wherein the process of (II) includes a process of: setting a largest area among one or more areas, which are respectively grouped according to at least one specific criteria by referring to at least one feature value on the specific decoded feature map, as a reference area,
wherein each of the weighted convolution filters for each of the grid cells is expressed as a following equation:

$$W\_C\_Filter_i = \alpha_i * B + \beta_i,$$

wherein $W\_C\_Filter_i$ denotes each value of each of the weighted convolution filters for each of the grid cells, B denotes a reference filter value corresponding to the reference area, and each of $\alpha_i$ and $\beta_i$ denotes each of linear transformation parameters corresponding to each of the weighted convolution filters for each of the grid cells, and
wherein, at the process of (III), the processor learns each of the weighted convolution filters for each of the grid cells by learning the $\alpha_i$, $\beta_i$, and B.

11. The learning device of claim 10, wherein, at the process of (II), the processor sets the largest area among one or more areas, which are respectively grouped according to a range of the feature value by referring to the feature value on the specific decoded feature map, as the reference area.

12. The learning device of claim 9, wherein the input image includes a plurality of training images, and
wherein, on condition that there are first location information to k-th location information corresponding to a first partial area to a k-th partial area in each of the plurality of the training images, the input image is selected to include specific training images in which respective relative variations of at least part of the first location information to the k-th location information are equal to or less than one or more predetermined thresholds.

13. The learning device of claim 9, wherein, at the process of (II), each of the grid cells has a same size and a same shape.

14. The learning device of claim 9, wherein the input image is an image representing a road-driving situation, and the learning device is used for free space detection while a vehicle is driving on a road.

15. A testing device for segmenting an image by using each of a plurality of weighted convolution filters for each of grid cells, comprising:
at least one memory that stores instructions; and
at least one processor, on condition that (1) a learning device has instructed an encoding layer of a convolutional neural network (CNN) module (i) to apply at least one convolution operation to at least one training image, to thereby generate at least one encoded feature map for training and (ii) the learning device has instructed a decoding layer of the CNN module to apply at least one deconvolution operation to a specific encoded feature map for training outputted from the encoding layer, to thereby generate at least one decoded feature map for training; (2) the learning device, if a specific decoded feature map for training outputted from the decoding layer is divided into a plurality of the grid cells according to one or more predetermined criteria, has instructed a weight convolution layer of the CNN module to set each of the weighted convolution filters therein to be corresponding to each of the grid cells, and to apply at least one weight convolution operation to the weight convolution layer to the specific decoded feature map for training outputted from the decoding layer, to thereby output a segmentation result for training; and (3) the learning device has performed backpropagation by using a segmentation loss obtained by referring to the segmentation result and its corresponding ground truth (GT), to thereby learn each of the weighted convolution filters for each of the grid cells; configured to execute the instructions to: perform processes of (I) instructing (i) the encoding layer of the CNN module to apply the at least one convolution operation to at least one test image, to thereby generate at least one encoded feature map for testing and (ii) the decoding layer of the CNN module to apply the at least one deconvolution operation to a specific encoded feature map for testing outputted from the encoding layer, to thereby generate at least one decoded feature map for testing, and (II) if a specific decoded feature map for testing outputted from the decoding layer is divided into a plurality of the grid cells according to one or more predetermined criteria, instructing the weight convolution layer of the CNN module to set each of the weighted convolution filters therein to be corresponding to each of the grid cells, and to apply the at least one weight convolution operation to the specific decoded feature map for testing outputted from the decoding layer, to thereby output a segmentation result for testing.

16. The testing device of claim 15, wherein the test image is an image representing a road-driving situation, and the testing device is used for free space detection while a vehicle is driving on a road.

* * * * *